US010936544B2

(12) United States Patent
Jain et al.

(10) Patent No.: US 10,936,544 B2
(45) Date of Patent: Mar. 2, 2021

(54) ENABLING CONSISTENCY IN PUSH ORDER FOR NETWORK CACHING

(71) Applicant: International Business Machines Corporation, Armonk, NY (US)

(72) Inventors: Abhishek Jain, Baraut (IN); William W. Owen, Tucson, AZ (US); Ashish Pandey, Pune (IN); Sandeep Naik, Pune (IN); Sasikanth Eda, Vijayawada (IN)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 15/981,776

(22) Filed: May 16, 2018

(65) Prior Publication Data

US 2019/0354619 A1 Nov. 21, 2019

(51) Int. Cl.
*G06F 16/172* (2019.01)
*G06F 3/06* (2006.01)
*H04L 29/08* (2006.01)
*G06F 16/182* (2019.01)

(52) U.S. Cl.
CPC ........... *G06F 16/172* (2019.01); *G06F 3/067* (2013.01); *G06F 16/183* (2019.01); *G06F 16/1824* (2019.01); *H04L 67/2842* (2013.01); *H04L 67/1097* (2013.01)

(58) Field of Classification Search
None
See application file for complete search history.

(56) References Cited

U.S. PATENT DOCUMENTS

| 7,571,168 B2* | 8/2009 | Bahar ................ G06F 9/5011 |
| 8,516,159 B2 | 8/2013 | Ananthanarayanan et al. |
| 9,176,980 B2 | 11/2015 | Ananthanarayanan et al. |
| 9,413,825 B2* | 8/2016 | Oliveira ............. H04L 67/1097 |

(Continued)

FOREIGN PATENT DOCUMENTS

WO 2017190150 A1 11/2017

OTHER PUBLICATIONS

IBM, "Introduction to Active File Management (AFM)," IBM Knowledge Center, 2018, 2 pages retrieved from https://www.ibm.com/support/knowledgecenter/STXKQY_4.2.3/com.ibm.spectrum.scale.v4r23.doc/bl1ins_introafm.htm.

(Continued)

*Primary Examiner* — Robert W Beausoliel, Jr.
*Assistant Examiner* — Cheryl M Shectman
(74) *Attorney, Agent, or Firm* — Zilka-Kotab, P.C.

(57) ABSTRACT

A computer-implemented method, according to one embodiment, includes: receiving a file operation, and determining a transaction identification which corresponds to the file operation. The transaction identification is used to create a unique queue which corresponds to the file operation. A number of fields included in the unique queue is equal to a number of sub-operations included in a predefined template associated with the file operation. Moreover, the number of fields included in the unique queue are populated as each of the respective number of sub-operations are performed. A determination is made as to whether each of the number of fields in the unique queue have been populated, and the unique queue is sent to a global queue in response to determining that each of the number of fields in the unique queue have been populated.

20 Claims, 11 Drawing Sheets

(56) References Cited

U.S. PATENT DOCUMENTS

| | | | | |
|---|---|---|---|---|
| 9,805,054 | B2* | 10/2017 | Davis | G06F 16/182 |
| 2007/0162462 | A1* | 7/2007 | Zhang | G06F 16/10 |
| 2010/0299306 | A1* | 11/2010 | Agetsuma | G06F 16/1734 |
| | | | | 707/609 |
| 2011/0314339 | A1* | 12/2011 | Daily | G06F 11/0781 |
| | | | | 714/37 |
| 2015/0113222 | A1* | 4/2015 | Naik | G06F 12/0808 |
| | | | | 711/133 |
| 2017/0091215 | A1 | 3/2017 | Beard et al. | |
| 2017/0091262 | A1 | 3/2017 | Beard et al. | |

OTHER PUBLICATIONS

IBM, "Cache and Home," IBM Knowledge Center, 2018, 2 pages retrieved from https://www.ibm.com/support/knowledgecenter/STXKQY_4.2.3/com.ibm.spectrum.scale.v4r23.doc/bl1ins_cacheandhomeAFM.htm.

Openstack, "Swift Architectural Overview," OpenStack Docs, 2018, pp. 1-4 retrieved from https://docs.openstack.org/swift/latest/overview_architecture.html.

Openstack, "Welcome to Swift's documentation!" OpenStack Docs, 2018, pp. 1-5 retrieved from http://docs.openstack.org/developer/swift/overview_ring.html.

* cited by examiner

ENABLING CONSISTENCY IN PUSH ORDER FOR NETWORK CACHING

BACKGROUND

The present invention relates to data storage systems, and more specifically, this invention relates to the management and transfer of data between sites in a data storage system.

Wide area network (WAN) caching is a scalable, file system caching layer which may be integrated with clustered file systems. A clustered file system is a file system which is shared by being simultaneously mounted on multiple servers. Accordingly, WAN caching provides a user the ability to create associations from a local cluster to a remote cluster and/or storage location. WAN caching may also allow for the user to define the storage location and flow of file data in order to automate the management of the data. As a result, the user may be able to implement a single namespace view across sites which are located around the world.

WAN caching uses a home-and-cache model in which a large centralized storage location ("home site") serves as the primary storage location for data, while exported data is stored in file systems at satellite sites ("cache site"). As a result, WAN caching is able to mask WAN latencies and outages by using the clustered file system to cache data sets, thereby allowing data access and modifications even when a remote storage cluster is unavailable. However, conventional products implementing WAN caching are only able to support a single file at a time. Performance also suffers when the single file includes multiple dependencies.

SUMMARY

A computer-implemented method, according to one embodiment, includes: receiving a file operation, and determining a transaction identification which corresponds to the file operation. The transaction identification is used to create a unique queue which corresponds to the file operation. A number of fields included in the unique queue is equal to a number of sub-operations included in a predefined template associated with the file operation. Moreover, the number of fields included in the unique queue are populated as each of the respective number of sub-operations are performed. A determination is made as to whether each of the number of fields in the unique queue have been populated, and the unique queue is sent to a global queue in response to determining that each of the number of fields in the unique queue have been populated.

A computer program product, according to another embodiment, includes a computer readable storage medium having program instructions embodied therewith. The computer readable storage medium is not a transitory signal per se. Moreover, the program instructions readable and/or executable by a controller to cause the controller to perform a method which includes: receiving, by the controller, a file operation; and determining, by the controller, a transaction identification which corresponds to the file operation. The transaction identification is used, by the controller, to create a unique queue which corresponds to the file operation. A number of fields included in the unique queue is equal to a number of sub-operations included in a predefined template associated with the file operation. Moreover, the number of fields included in the unique queue are populated, by the controller, as each of the respective number of sub-operations are performed. A determination is made, by the controller, as to whether each of the number of fields in the unique queue have been populated; and the unique queue is sent, by the controller, to a global queue in response to determining that each of the number of fields in the unique queue have been populated.

A system, according to yet another embodiment, includes: a processor, and logic integrated with the processor, executable by the processor, or integrated with and executable by the processor. The logic is configured to: receive, by the processor, a file operation; and determine, by the processor, a transaction identification which corresponds to the file operation. The transaction identification is used, by the processor, to create a unique queue which corresponds to the file operation. A number of fields included in the unique queue is equal to a number of sub-operations included in a predefined template associated with the file operation. The number of fields included in the unique queue are populated, by the processor, as each of the respective number of sub-operations are performed. Moreover, a determination is made, by the processor, as to whether each of the number of fields in the unique queue have been populated; and the unique queue is sent, by the processor, to a global queue in response to determining that each of the number of fields in the unique queue have been populated.

Other aspects and embodiments of the present invention will become apparent from the following detailed description, which, when taken in conjunction with the drawings, illustrate by way of example the principles of the invention.

DETAILED DESCRIPTION

Figure 1:
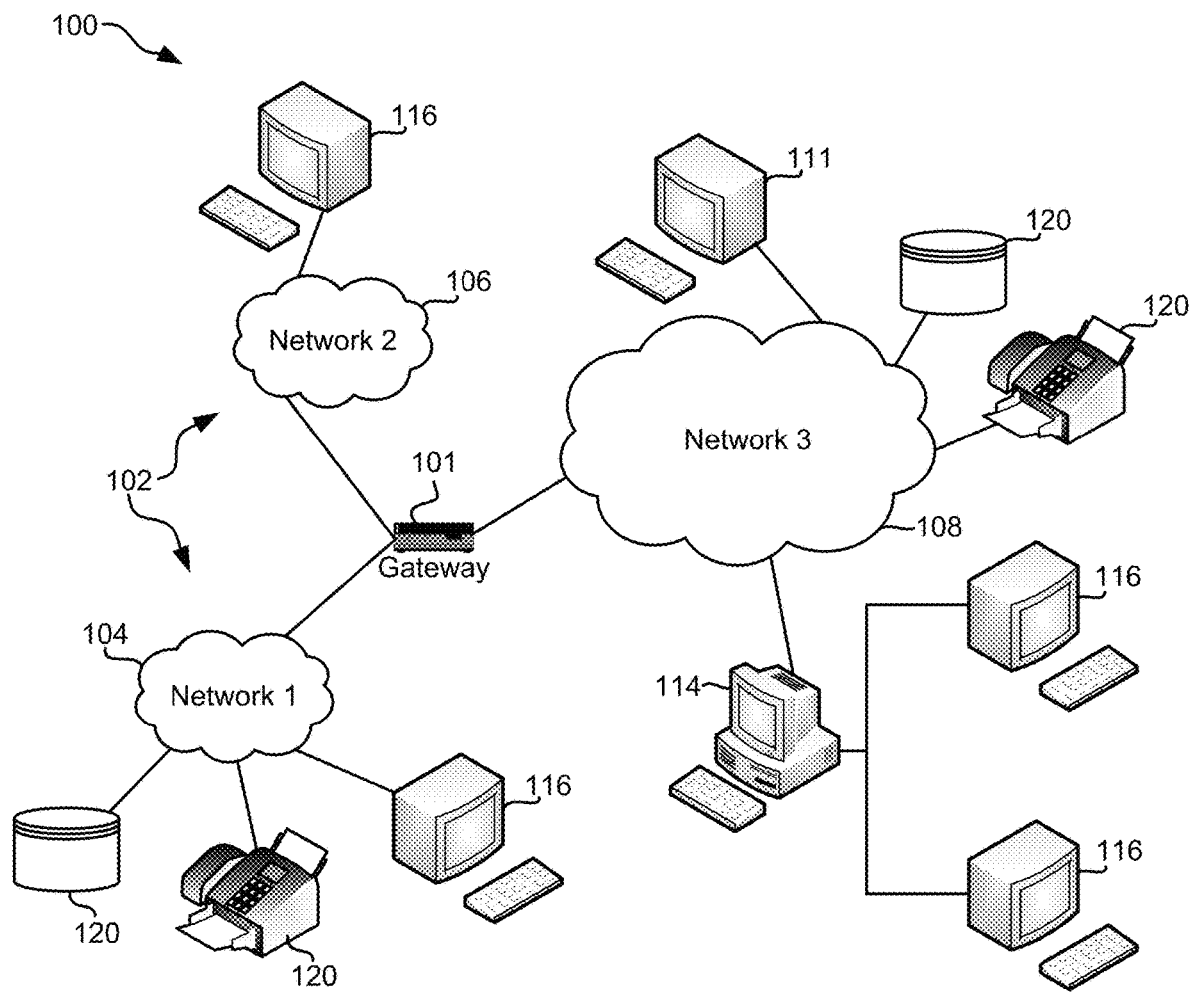
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products which are able to significantly improve the efficiency and consistency at which storage environments implementing WAN caching and/or object-based workloads are able to operate. Some of the embodiments included herein are able to achieve this improved performance by forming a unique (e.g., individual) queue for each file operation which is currently being processed. As a result, file events may be grouped based on a corresponding request transaction identification (ID), before being pushed to a remote site in a controlled fashion, e.g., as will be described in further detail below.

In one general embodiment, a computer-implemented method includes: receiving a file operation, and determining a transaction identification which corresponds to the file operation. The transaction identification is used to create a unique queue which corresponds to the file operation. A number of fields included in the unique queue is equal to a number of sub-operations included in a predefined template associated with the file operation. Moreover, the number of fields included in the unique queue are populated as each of the respective number of sub-operations are performed. A determination is made as to whether each of the number of fields in the unique queue have been populated, and the unique queue is sent to a global queue in response to determining that each of the number of fields in the unique queue have been populated.

In another general embodiment, a computer program product includes a computer readable storage medium having program instructions embodied therewith. The computer readable storage medium is not a transitory signal per se. Moreover, the program instructions readable and/or executable by a controller to cause the controller to perform a method which includes: receiving, by the controller, a file operation; and determining, by the controller, a transaction identification which corresponds to the file operation. The transaction identification is used, by the controller, to create a unique queue which corresponds to the file operation. A number of fields included in the unique queue is equal to a number of sub-operations included in a predefined template associated with the file operation. Moreover, the number of fields included in the unique queue are populated, by the controller, as each of the respective number of sub-operations are performed. A determination is made, by the controller, as to whether each of the number of fields in the unique queue have been populated; and the unique queue is sent, by the controller, to a global queue in response to determining that each of the number of fields in the unique queue have been populated.

In yet another general embodiment, a system includes: a processor, and logic integrated with the processor, executable by the processor, or integrated with and executable by the processor. The logic is configured to: receive, by the processor, a file operation; and determine, by the processor, a transaction identification which corresponds to the file operation. The transaction identification is used, by the processor, to create a unique queue which corresponds to the file operation. A number of fields included in the unique queue is equal to a number of sub-operations included in a predefined template associated with the file operation. The number of fields included in the unique queue are populated, by the processor, as each of the respective number of sub-operations are performed. Moreover, a determination is made, by the processor, as to whether each of the number of fields in the unique queue have been populated; and the unique queue is sent, by the processor, to a global queue in response to determining that each of the number of fields in the unique queue have been populated.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
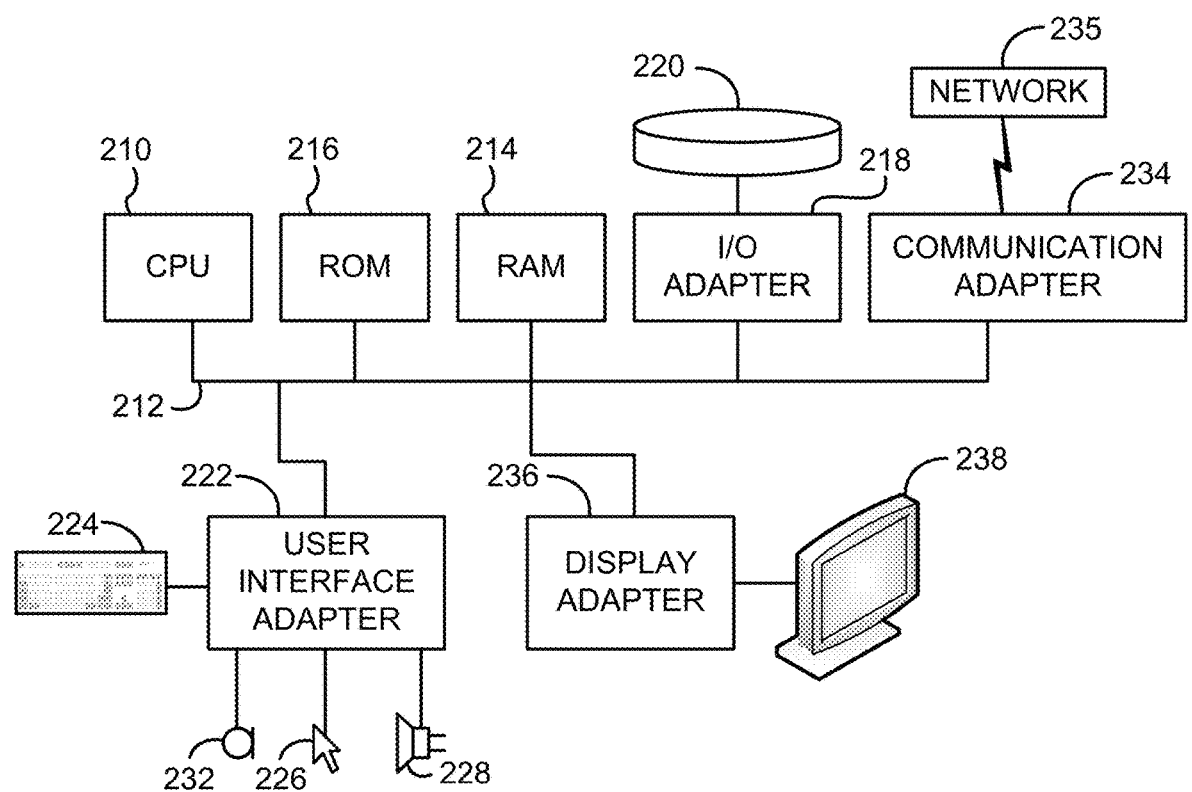
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
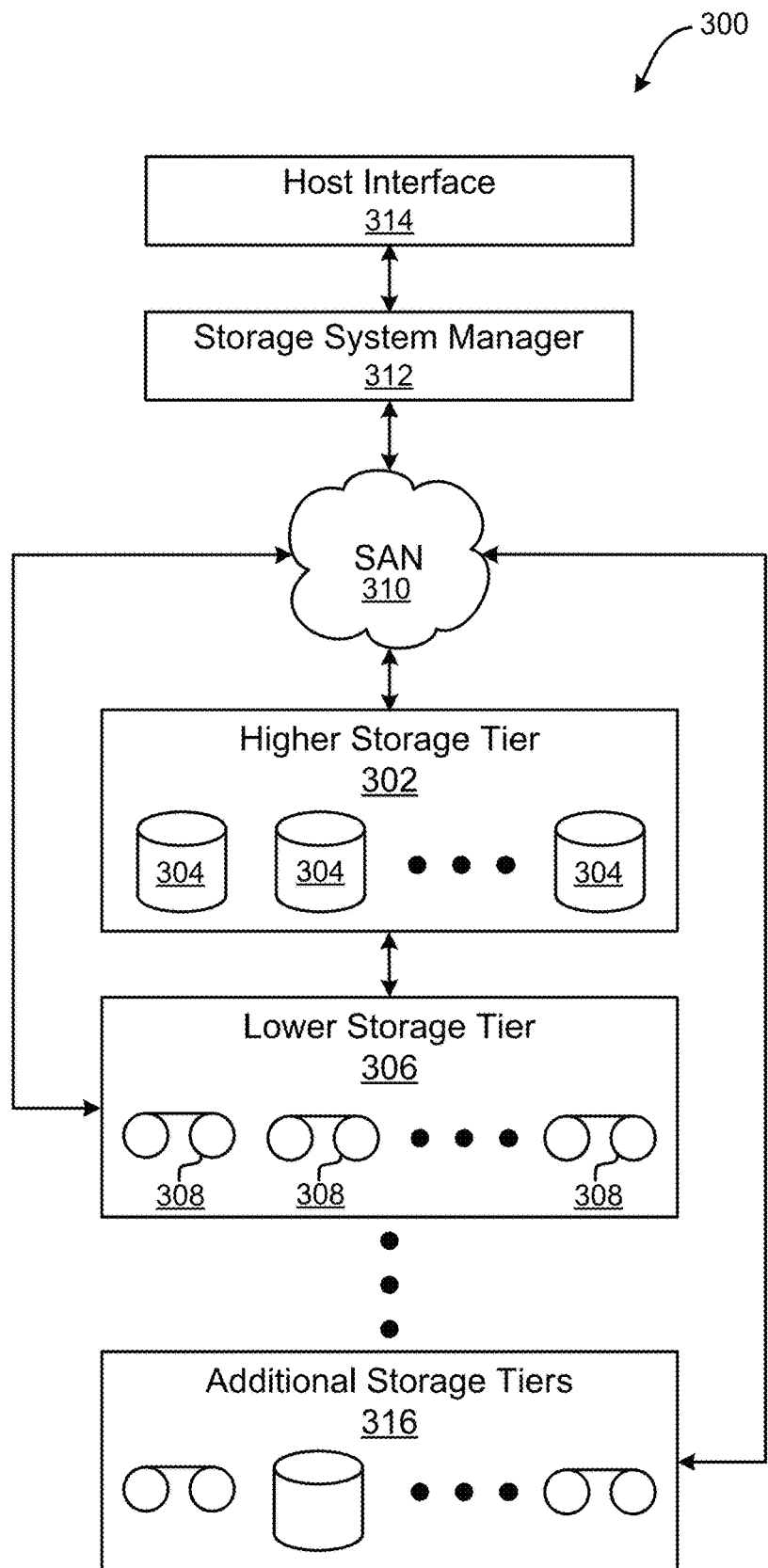
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As mentioned above, WAN caching desirably allows a user the ability to implement a single namespace view across sites which are located around the world. WAN caching also uses a home-and-cache model in which a large centralized storage location ("home site") serves as the primary storage location for data, while exported data is stored in file systems at satellite sites ("cache site"). As a result, WAN caching is able to mask WAN latencies and outages by using the clustered file system to cache data sets, thereby allowing data access and modifications even when a remote storage cluster is unavailable.

However, conventional products implementing WAN caching and similar type file management architectures are only able to support simple file workload where the atomicity of operations is limited to a single file and has no other dependencies. Accordingly, conventional products fail to operate efficiently in situations involving object workloads having numerous file operations linked to each other to represent the state of an object. For instance, situations involving inode changes, a same inode having different paths, etc.

At least some of these shortcomings stem from the fact that, although operations are queued at a gateway node and pushed to a home site, conventional products are not able to understand the correlation between the operations (as they can constitute to multiple inode) and link them as single object operation. Furthermore, conventional products are not able to ensure that these operations are queued in an order, nor able to mark the object on a home site as inconsistent even if one of the operations corresponding thereto is lost, e.g., due to network delays.

In sharp contrast, various ones of the embodiments included herein introduce the ability to significantly improve consistency for storage environments which implement WAN caching in combination with object-based workloads. Some of the approaches included herein are able to achieve this improved performance by forming a unique (e.g., individual) queue for each file operation which is currently being processed. As a result, file events may be grouped based on a corresponding request transaction ID, before being pushed to a remote site in a controlled fashion. Other approaches may also achieve improved performance by enabling marking, and pre-allocating using a global queue for each object, e.g., as will be described in further detail below.

Figure 4:
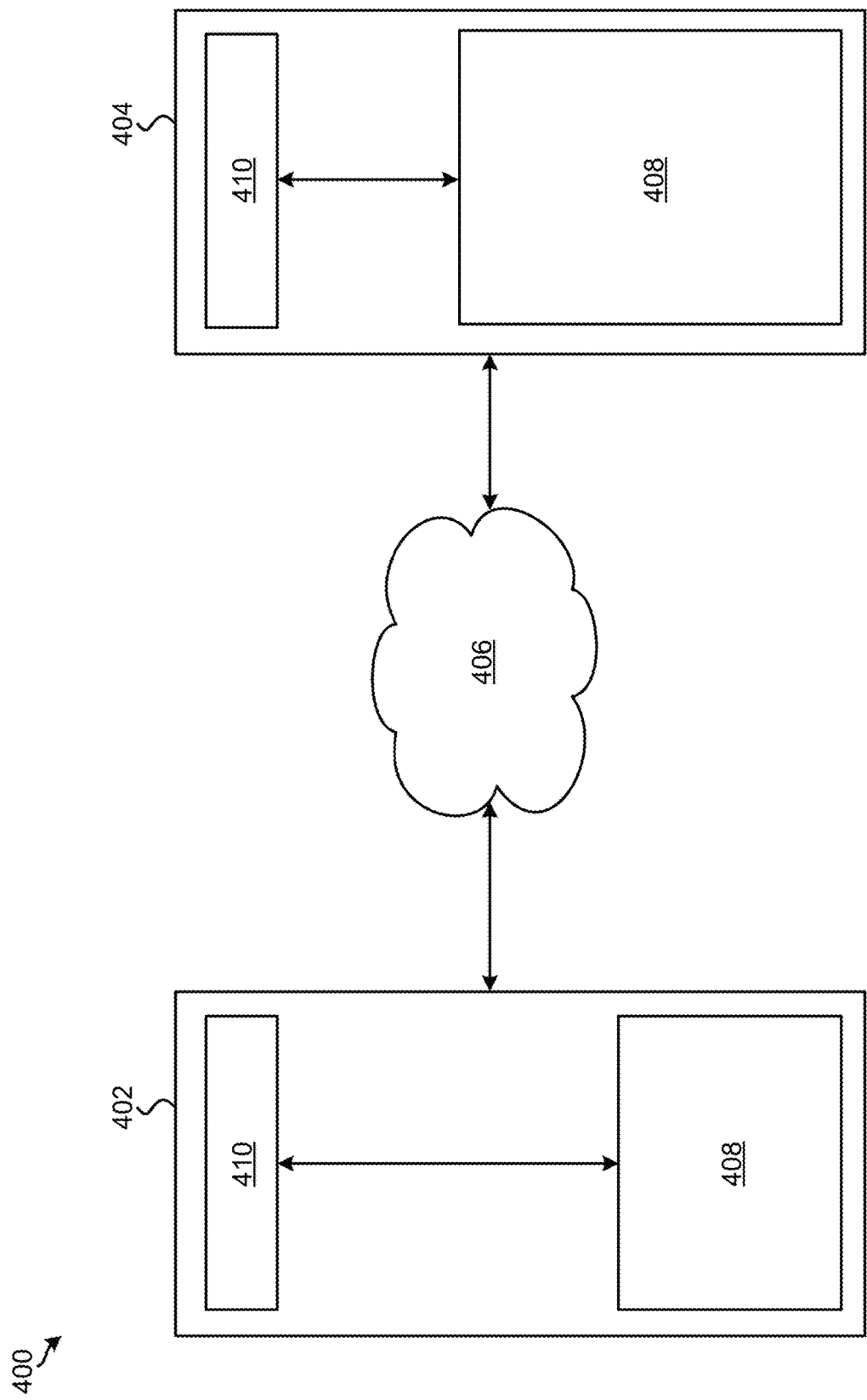
FIG. 4 is a partial representative view of a distributed data storage system in accordance with one embodiment.

Looking to FIG. 4, a distributed data storage system 400 is illustrated in accordance with one embodiment. As an option, the present data storage system 400 may be implemented in conjunction with features from any other embodiment listed herein, such as those described with reference to the other FIGS. However, such data storage system 400 and others presented herein may be used in various applications and/or in permutations which may or may not be specifically described in the illustrative embodiments listed herein. Further, the data storage system 400 presented herein may be used in any desired environment. Thus FIG. 4 (and the other FIGS.) may be deemed to include any possible permutation.

As shown, the data storage system 400 includes a first storage location 402 and a second storage location 404 which are connected by a network 406. According to preferred approaches, the first storage location 402 and the second storage location 404 each include data storage components (e.g., memory) 408 which are configured as object-based file systems. In other words, the first and second storage locations 402, 404 preferably include object-based file systems which may be used to implement object storage. Moreover, a controller (e.g., processor) 410 is included in each of the first and second storage locations 402, 404, each of the controllers 410 being electrically coupled to the respective storage components 408. The controllers 410 at the first and second storage locations 402, 404 may also be able to communicate with each other (e.g., send data, commands, requests, etc. to each other) using a connection to network 406.

The network 406 connecting the first and second storage locations 402, 404 may be a WAN according to some approaches. Accordingly, the data storage system 400 may implement WAN caching, e.g., according to any of the approaches described herein. However, the network 406 may include any desired type of network, e.g., such as a LAN, a SAN, a personal area network (PAN), etc., e.g., depending on the approach. For instance, the type of network 406 used to connect the first and second storage locations 402, 404 may depend on the distance separating the storage locations. According to some approaches, the first and second storage locations 402, 404 may be geographically separated by any amount of distance.

As described above, WAN caching may implement a "home-and-cache" model in which a large centralized storage location ("home site") serves as the primary storage location for data, while exported data is stored in file systems at satellite sites ("cache site"). Accordingly, referring still to FIG. 4, the first storage location 402 may serve as a satellite site, or "cache site", while the second storage location 404 serves as a centralized storage location, or "home site". In some approaches, a global queue may be implemented in the storage component (e.g., memory) 408 at the second storage location 404.

Although FIG. 4 only depicts one cache site connected to the home site, the second storage location 404 may be coupled to any number of cache sites in other embodiments. As a result, the second storage location 404 includes a storage component 408 (e.g., memory) having a larger storage capacity than the storage component 408 included in the first storage location 402.

As data is stored in the first storage location 402, it may be transferred to the second storage location 404 over time using network 406. For example, as the storage component 408 in the first storage location 402 fills, data may be transferred to the storage component 408 in the second storage location 404. As mentioned above, the first storage location 402 may serve as a "cache site", while the second storage location 404 serves as a "home site" which may implement a global queue. Accordingly, the controllers 410 may implement various processes of WAN caching, e.g., as described below with respect to method 500.

Figure 5A:
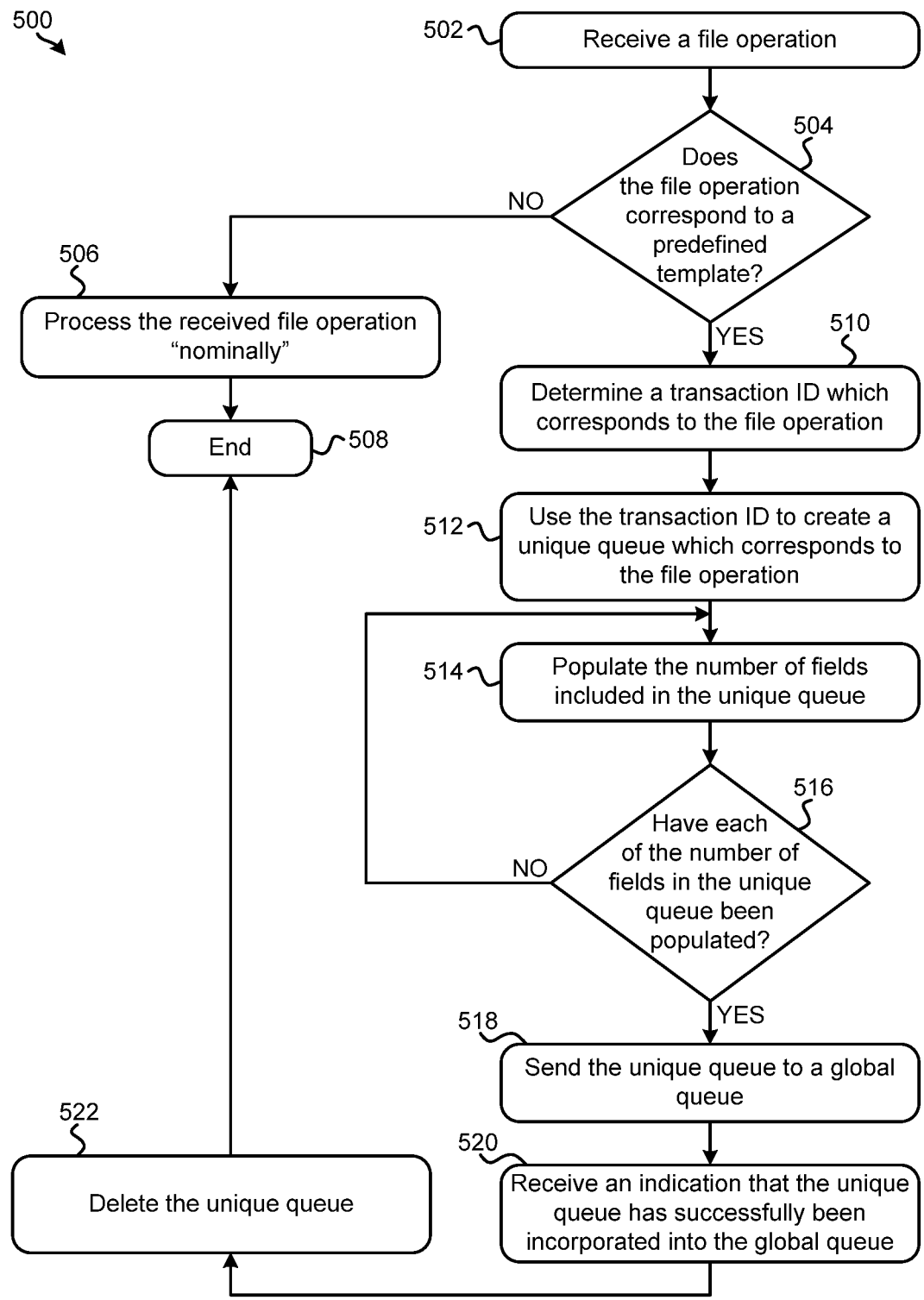
FIG. 5A is a flowchart of a method in accordance with one embodiment.

Now referring to FIG. 5A, a flowchart of a computer-implemented method 500 is shown according to one embodiment. The method 500 may be performed in accordance with the present invention in any of the environments depicted in FIGS. 1-4, among others, in various embodiments. Of course, more or less operations than those specifically described in FIG. 5A may be included in method 500, as would be understood by one of skill in the art upon reading the present descriptions.

Each of the steps of the method 500 may be performed by any suitable component of the operating environment. For example, in various embodiments, the method 500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

It should be noted that although any of the processes included in method 500 may be implemented in any desired environment using any desired type of processing component, various ones of the processes depicted in FIG. 5A are preferably implemented in a storage environment having object-based file systems, e.g., as described above in FIG. 4. According to a specific approach, which is in no way intended to limit the invention, various ones of the processes depicted in FIG. 5A may be performed by a processor which is implemented at a cache site in a distributed the data storage system (e.g., see controller 410 at the first storage location 402 in FIG. 4). Accordingly, method 500 may be initiated in some approaches in response to ensuring that an object-based fileset (namespace) has been configured, e.g., such that WAN caching may be implemented as would be appreciated by one skilled in the art after reading the present description.

Looking to FIG. 5A, operation 502 of method 500 includes receiving a file operation. Depending on the approach, the file operation may be received from a host (e.g., a user), a data storage controller, a remote storage location, etc. Moreover, the type of file operation may also vary depending on the approach. For instance, a file operation may include a "PUT" or "CREATE" command, an "UPDATE" command, a "POST" command, a "DELETE" command, etc. Certain types of file operations may also have predefined templates associated therewith. In other words, a template which specifies a certain number and/or order of sub-operations to be performed for a given object-based operation may be predefined for certain types of file operations that are received. Such templates may be predefined by a user, a controller, industry standards, etc. Moreover, the sub-operations included in a given prespecified template may be limited to a single inode, or may correspond to more than one different inodes, depending on the approach.

Accordingly, decision 504 includes determining whether the file operation corresponds to a predefined template. The outcome of decision 504 may be determined, at least in part, by evaluating a list of predefined templates which are supported. In some approaches a lookup table which includes each of the supported predefined templates may be stored in memory and maintained.

Method 500 proceeds to operation 506 in response to determining that the file operation does not correspond to a predefined template. There, operation 506 includes processing the received file operation "nominally". In other words, operation 506 includes treating the received file operation as a normal file operation which does not have any specific order and/or number of object operations linked thereto. As a result, the received file operation may be pushed directly to a global caching queue which may be implemented on a gateway node at a centralized storage location (e.g., "home site"). The global caching queue may thereby manage performance of the received file operation.

From operation 506, the flowchart proceeds to operation 508 whereby method 500 may end. However, it should be noted that although method 500 may end upon reaching operation 508, any one or more of the processes included in method 500 may be repeated in order to process additional file operation. In other words, any one or more of the processes included in method 500 may be repeated for subsequently received file operations.

Returning to decision 504, method 500 may proceed to operation 510 in response to determining that the received file operation does correspond to a predefined template. There, operation 510 includes determining a transaction ID which corresponds to the file operation. A transaction ID may be used in the process of creating a unique queue which corresponds to the received file operation, which, as mentioned above, may lead to significant improvements to the efficiency and consistency at which the storage environment implementing method 500 is able to operate.

Figure 5B:
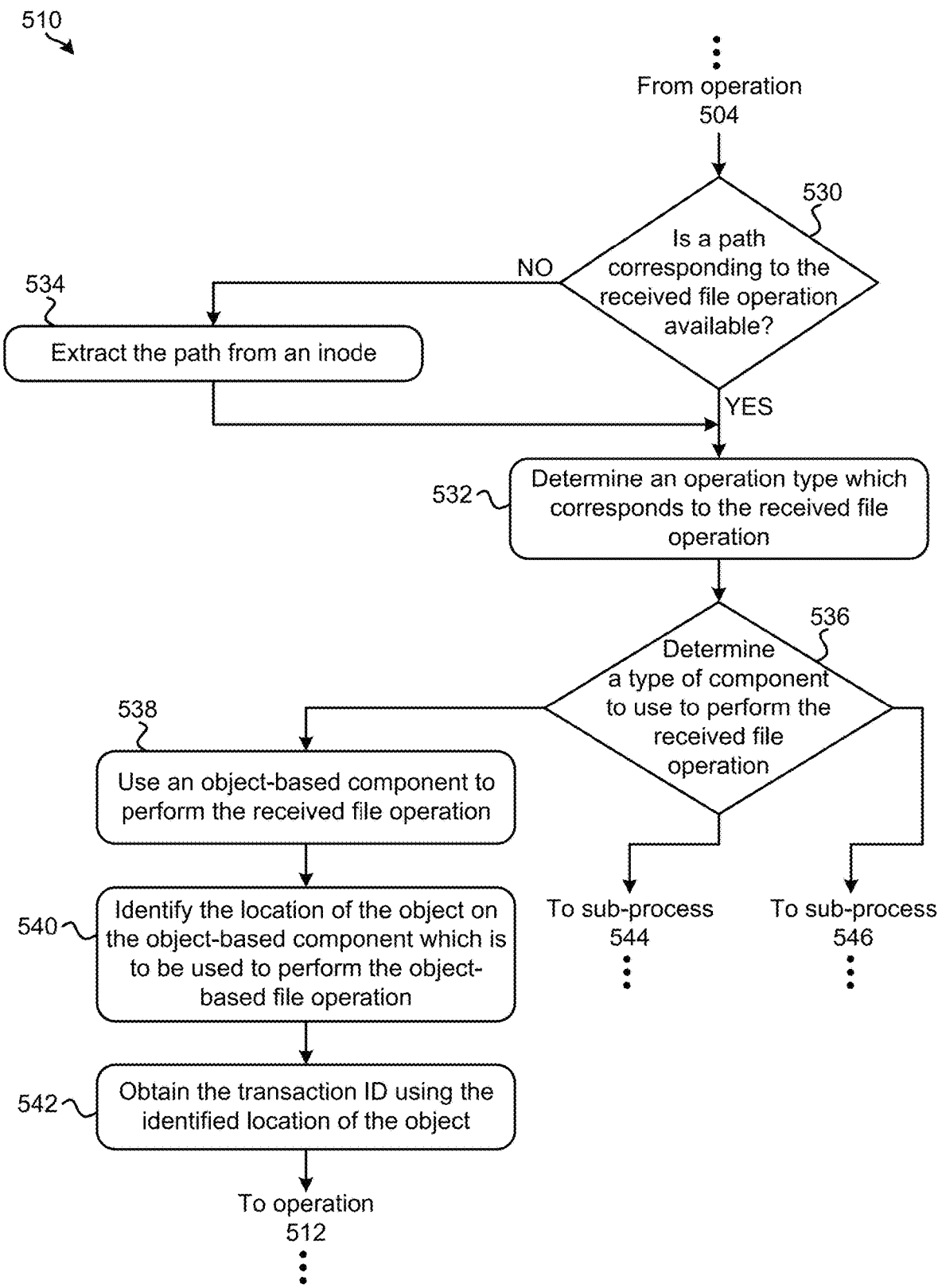
FIG. 5B is a flowchart of sub-processes for one of the operations in the method of FIG. 5A, in accordance with one embodiment.
Figure 5B:
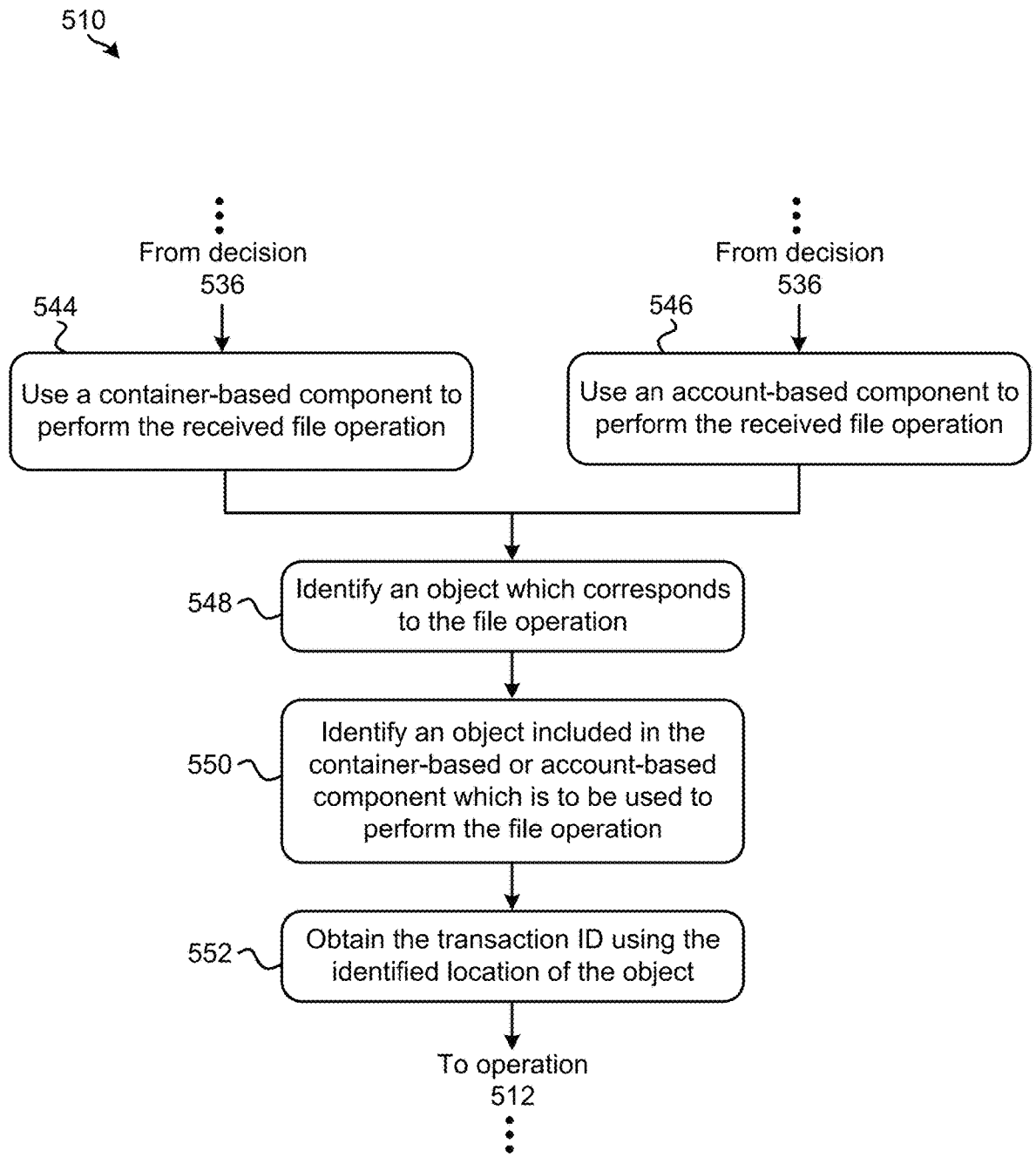

Referring momentarily to FIG. 5B, the various sub-processes included therein may be implemented in order to determine a transaction ID for a given file operation. Accordingly, one or more of the sub-processes included in FIG. 5B may be implemented in order to perform operation 510 of FIG. 5A, e.g., as will be described in further detail below. According to some approaches, the process of determining a transaction ID for a given file operation may include using a modified consistency hashing algorithm.

With continued reference to FIG. 5A, method 500 further includes using the transaction ID to create a unique queue which corresponds to the file operation. See operation 512. Again, this unique queue corresponds to the received file operation individually such that it may only be used to track a number of sub-operations which are performed as a part of the received file operation. In other words, the unique queue may not be used to track sub-operations which correspond to any other received file operations, even if they correspond to a same predefined template. It follows that a unique queue may be created for each file operation received which corresponds to a predefined template, e.g., as will be described in further detail below.

The unique queue created in operation 512 preferably includes a number of fields which is equal to a number of sub-operations included in the predefined template associated with the file operation. The fields in the unique queue may be used to track the sub-operations corresponding to the received file operation as they are performed, thereby keeping an accurate count of which sub-operations remain outstanding. Implementing the unique queue is also able to ensure that the sub-operations corresponding to the received file operation are performed in a desired order, thereby ensuring that the file operation is completed successfully. Accordingly, operation 512 may refer to the predefined template which is associated with the file operation in order to create the unique queue which corresponds thereto. Moreover, the fields included in the unique queue may be implemented using any approaches which would be apparent to one skilled in the art after reading the present description.

As each of the sub-operations of the file operation are performed, the corresponding fields of the unique queue are preferably updated to reflect the current performance status. Accordingly, operation 514 includes populating the number of fields included in the unique queue as each of the respective number of sub-operations are performed. A unique queue preferably remains active until each of the sub-operations corresponding thereto have been performed. Depending on the approach, the fields may be populated differently. For instance, the manner in which the fields of the unique queue are populated may depend on how the unique queue is implemented, the type of file operation, a number of sub-operations which correspond to the file operation, etc. In some approaches the fields of the unique queue may be populated with information (e.g., data) which corresponds to each of the sub-operations that are performed. For example, sub-operations corresponding to performing a "PUT" file operation may include creating a directory and/or writing object content to a directory. In such an example, the fields of the unique queue which correspond to these sub-operations may store directory information and/or storage location information associated with the object content, e.g., as would be appreciated by one skilled in the art after reading the present description. However, in other approaches at least some of the fields of a unique queue may include a flag which is set in response to determining that the corresponding sub-operation has been performed.

Figure 5C:
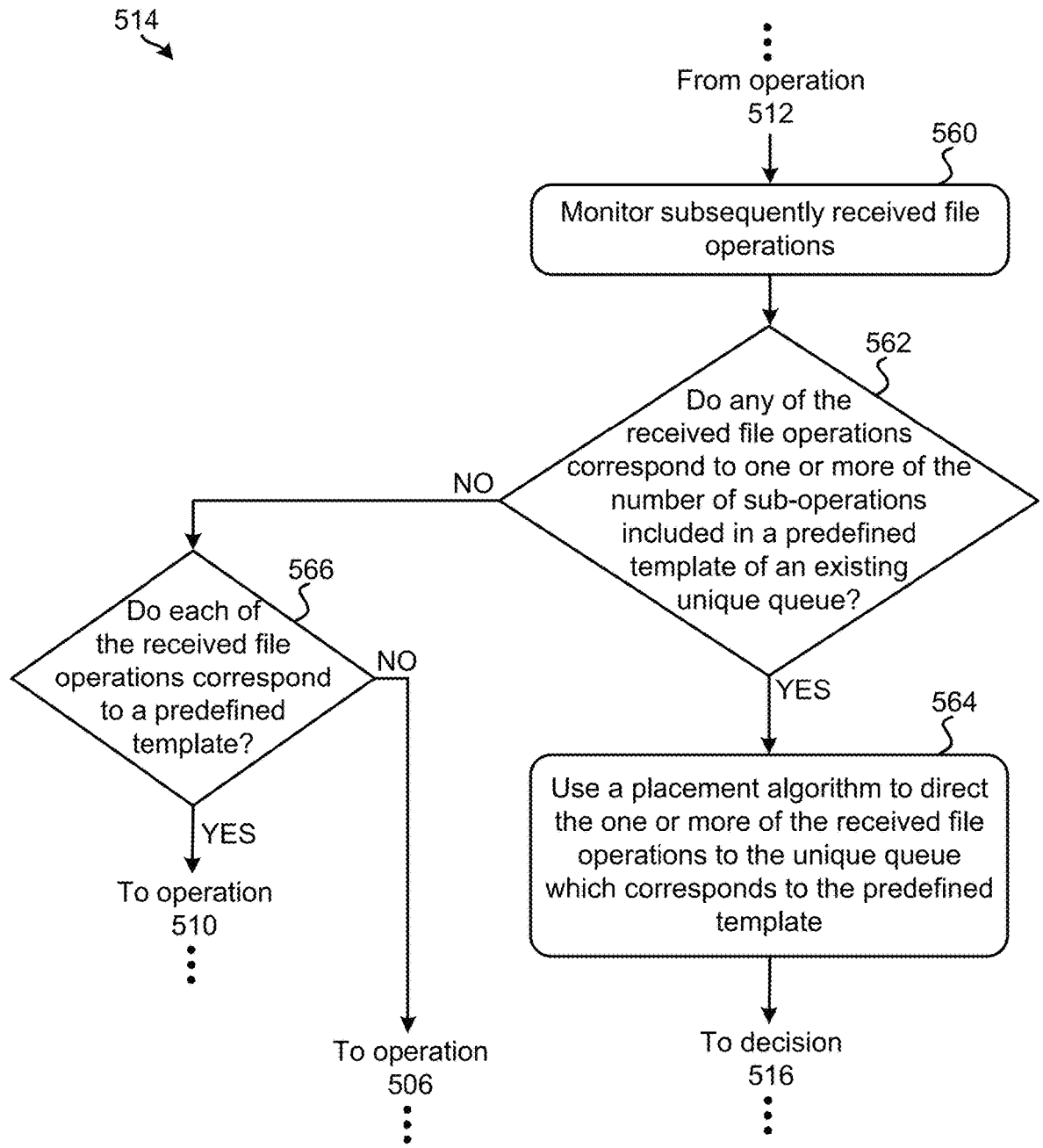
FIG. 5C is a flowchart of sub-processes for one of the operations in the method of FIG. 5A, in accordance with one embodiment.

Referring momentarily to FIG. 5C, the various sub-processes included therein may be implemented in order to populate the number of fields included in the unique queue as each of the respective number of sub-operations are performed. Accordingly, one or more of the sub-processes included in FIG. 5C may be implemented in order to perform operation 514 of FIG. 5A, e.g., as will be described in further detail below.

With continued reference to FIG. 5A, once each of the number of fields in the unique queue have been populated (e.g., filled), it may be determined that each of the sub-operations corresponding to the received file operation have been performed, and that the file operation itself has been completed. Accordingly, decision 516 includes determining whether each of the number of fields in the unique queue have been populated. The flowchart returns to operation 514 in response to determining that each of the number of fields in the unique queue have not yet been populated, whereby additional fields may be populated as the corresponding sub-operations are performed. It follows that operation 514 and decision 516 may be repeated a number of times before each of the fields of the unique queue have been populated.

However, method 500 proceeds to operation 518 in response to determining that each of the number of fields in the unique queue have been populated. There, operation 518 includes sending the unique queue to a global queue, preferably such that the unique queue may be merged with the global queue. Once again, one or more remote storage locations may serve as "cache sites", while a larger, more centralized storage location serves as a "home site". The home site may implement a global queue which reflects the current status of various files (specific portions of data), and which is accessible to the various cache sites coupled thereto. Updates to the files included in the global queue may also be received from the various cache sites, and implemented at the home site. Accordingly, the global queue at the home site may provide a single namespace view which is continuously updated and accessible from various locations (e.g., clusters) around the world. Performance may further be improved by using the global queue to perform marking and/or pre-allocating for each object.

As a result, method 500 is able to ensure that the sub-operations which are performed as a part of a received file operation are queued in a specific order. Moreover, an object corresponding to the received file operation may be marked at the home site as being inconsistent in response to losing one or more of the previously performed sub-operations corresponding thereto, e.g., due to network delays. The process of pushing unique queues to the global queue once they are filled (each sub-operation corresponding to the file operation has been satisfied) allows for the global queue to be merged with a unique queue in a strict order. This desirably increases reliability, efficiency, organization, etc. of the storage system which may be used to implement various ones of the processes included in method 500.

Referring still to FIG. 5A, operation 520 includes receiving an indication that the unique queue has successfully been incorporated into the global queue. Furthermore, operation 522 includes deleting the unique queue in response to receiving the indication in operation 520. Once the unique queue has been successfully merged into the global queue, the unique queue becomes superfluous and may therefore be deleted to avoid unnecessary use of storage space in memory.

From operation 522, the flowchart is shown as proceeding to operation 508, whereby method 500 may end. However, it should again be noted that although method 500 may end upon reaching operation 508, any one or more of the processes included in method 500 may be repeated in order to process additional file operation. In other words, any one or more of the processes included in method 500 may be repeated for subsequently received file operations.

According to an exemplary embodiment, which is in no way intended to limit the invention, at least some of the processes included in method 500 may be repeated in response to receiving a subsequent "second" file operation. For instance, depending on whether the "second" file operation is received before or after operation 508 has been reached for a previously received "first" file operation, some of the processes included in method 500 may be performed simultaneously and/or in parallel. Accordingly, a processor being used to perform the processes included in method 500 may have the ability to perform more than one process simultaneously and/or in parallel. However, in other approaches the processor being used to perform the processes included in method 500 may have the ability to delegate one or more processes to another processor, e.g., such that more than one process may be performed simultaneously and/or in parallel for two or more separately received file operations.

Again, a unique queue may only be used to track sub-operations which correspond to a specific file operation. Thus, a second unique queue is preferably created for the second file operation in response to determining that the second file operation corresponds to a predefined template. Accordingly, each of processes 510, 512, 514, 516, 518, 520, and 522 may be repeated for the second file operation in response to determining that the second file operation corresponds to a predefined template.

Looking now to FIG. 5B, exemplary sub-processes of determining a transaction ID for a given file operation are illustrated in accordance with one embodiment, one or more of which may be used to perform operation 510 of FIG. 5A. However, it should be noted that the sub-processes of FIG. 5B are illustrated in accordance with one embodiment which is in no way intended to limit the invention.

The transaction ID for a given file operation may be determined using an operation type, and a path of the file operation. Accordingly, decision 530 includes determining whether a path corresponding to the received file operation is available. In some approaches, a path corresponding to the file operation may be received as an input along with the file operation. Thus, in such approaches, the flowchart may proceed directly to sub-process 532 in response to determining that a path corresponding to the received file operation is available. In other words, it may be deduced that upon reaching sub-process 532, a path which corresponds to the file operation has been determined.

Returning to decision 530, the flowchart may proceed to sub-process 534 in response to determining that a path corresponding to the received file operation is not available. Sub-process 534 includes extracting (e.g., obtaining) the path from an inode which corresponds to the received file operation. According to some approaches, sub-process 534 may include using one or more directory traversal algorithms in combination with the inode in order to extract the path of the file operation, e.g., as would be appreciated by one skilled in the art after reading the present description.

From sub-process 534, the flowchart proceeds to sub-process 532 which includes determining an operation type which corresponds to the received file operation. For example, a file operation may be an object-based file operation, a container-based file operation, an account-based file operation, etc. Moreover, file operations may actually be performed using different components depending on the operation type which corresponds thereto. An illustrative list of components which may be used to perform the received file operation includes, but is in no way limited to, one or more servers, a database, one or more data-servers, etc. Thus, by determining an operation type which corresponds to the received file operation, FIG. 5B may be able to further determine the one or more components which may be used to perform the file operation.

Once sub-process 532 has been performed, the flowchart proceeds to decision 536 which includes determining a type of component to use to perform the received file operation. As mentioned above, the component which is used to perform the file operation may depend on an operation type which corresponds to the file operation. Thus, decision 536 may be based, at least in part, on the outcome of sub-process 532.

From decision 536, the flowchart is shown as splitting into three possible branches. Each of the possible branches correspond to a different operation type, and therefore a different type of component to perform the file operation with. It follows that the flowchart may proceed differently depending on the outcome of decision 536. It should also be noted that the number and/or configuration of the possible branches extending from decision 536 are in no way intended to limit the invention. For example, the flowchart may incorporate any number of operation types and/or types of components to perform the file operation with, e.g., depending on the desired approach.

The flowchart may proceed from decision 536 to sub-process 538 in response to determining that an object-based component should be used to perform the received file operation. As mentioned above, this determination may be based on a conclusion that the received file operation is an object-based file operation (e.g., that the file operation is an "object type"), and therefore that an object-based component should be used to perform the file operation. From sub-process 538, the flowchart proceeds to sub-process 540 which identifies an object included in the object-based component which is to be used to perform the file operation. In other words, sub-process 540 includes identifying the location of the object on the object-based component which is to be used to perform the object-based file operation.

From sub-process 540, the flowchart proceeds to sub-process 542 which includes obtaining the transaction ID using the identified location of the object. The transaction ID may be obtained from an object log by using the identified location of the object according to some approaches. In other approaches, the transaction ID may be obtained by evaluating an object request associated with the identified location of the object, e.g., as would be appreciated by one skilled in the art after reading the present description.

Returning to decision 536, the flowchart proceeds to sub-process 544 in response to determining that a container-based component should be used to perform the received file operation. As mentioned above, this determination may be based on a conclusion that the received file operation is a container-based file operation (e.g., that the file operation is a "container type"), and therefore that a container-based component should be used to perform the file operation. However, the flowchart proceeds to sub-process 546 from decision 536 in response to determining that an account-based component should be used to perform the received file operation. Again, this determination may be based on a conclusion that the received file operation is an account-based file operation (e.g., that the file operation is an "account type"), and therefore that an account-based component should be used to perform the file operation.

FIG. 5B is shown as proceeding to sub-process 548 from sub-process 544 as well as sub-process 546. There, sub-process 548 includes identifying an object which corresponds to the file operation. In other words, sub-process 548 may include identifying a corresponding object which will ultimately cause an update to the data as a result of the file operation being performed. The identified object may further be used to build (e.g., construct) a correlation between the file operation and memory.

Sub-process 550 further includes identifying an object included in the container-based or account-based component (depending on the outcome of decision 536) which is to be used to perform the file operation. In other words, sub-process 550 includes identifying the location of the object on the component which is to be used to perform the file operation. The flowchart additionally includes obtaining the transaction ID using the identified location of the object. See sub-process 552. As described above, the transaction ID may be obtained from an object log by using the identified location of the object according to some approaches. In other approaches, the transaction ID may be obtained by evaluating an object request associated with the identified location of the object, e.g., as would be appreciated by one skilled in the art after reading the present description.

Looking now to FIG. 5C, exemplary sub-processes of populating the number of fields included in the unique queue as each of the respective number of sub-operations are performed in accordance with one embodiment, one or more of which may be used to perform operation 514 of FIG. 5A. However, it should be noted that the sub-processes of FIG. 5C are illustrated in accordance with one embodiment which is in no way intended to limit the invention.

Over time, additional file operations (e.g., instructions, data, commands, etc.) may be received following the file operation received in operation 502 of FIG. 5A. While some of these additional file operations may correspond to a predefined template, thereby triggering the creation of another unique queue, other ones of the additional file operation may correspond to sub-operations included in the predefined template of an existing unique queue. Accordingly, sub-process 560 of FIG. 5C includes monitoring subsequently received file operations. Decision 562 further includes determining whether any of the received file operations correspond to one or more of the number of sub-operations included in the predefined template of an existing unique queue. For example, decision 562 may determine whether any of the received file operations correspond to one or more of the number of sub-operations included in the predefined template identified in operation decision 504 of FIG. 5A.

Referring still to FIG. 5C, the flowchart proceeds to sub-process 564 in response to determining that one or more of the received file operations do correspond to one or more of the number of sub-operations included in the predefined template. There, sub-process 564 includes using a placement algorithm to direct the one or more of the received file operations to the unique queue which corresponds to the predefined template. As a result, the unique queue may be filled as each of the sub-operations corresponding thereto are received and/or performed.

Returning to decision 562, the flowchart is shown as proceeding to decision 566 in response to determining that the received file operations do not correspond to one or more of the number of sub-operations included in the predefined template of an existing unique queue. There, decision 566 includes determining whether each of the received file operations correspond to a predefined template. In response to determining that a received file operation does not correspond to a predefined template, the flowchart proceeds to operation 506 of FIG. 5A, whereby the file operation may be processed "nominally" as described above. However, the flowchart may proceed to operation 510 in response to determining that a received file operation does correspond to a predefined template, such that another unique queue may be created. It follows that decision 562 may perform similarly to decision 504 of FIG. 5A for file operations which are received "on the fly" while currently processing other file operations. Accordingly, any of the approaches described above may be implemented.

Figure 5D:
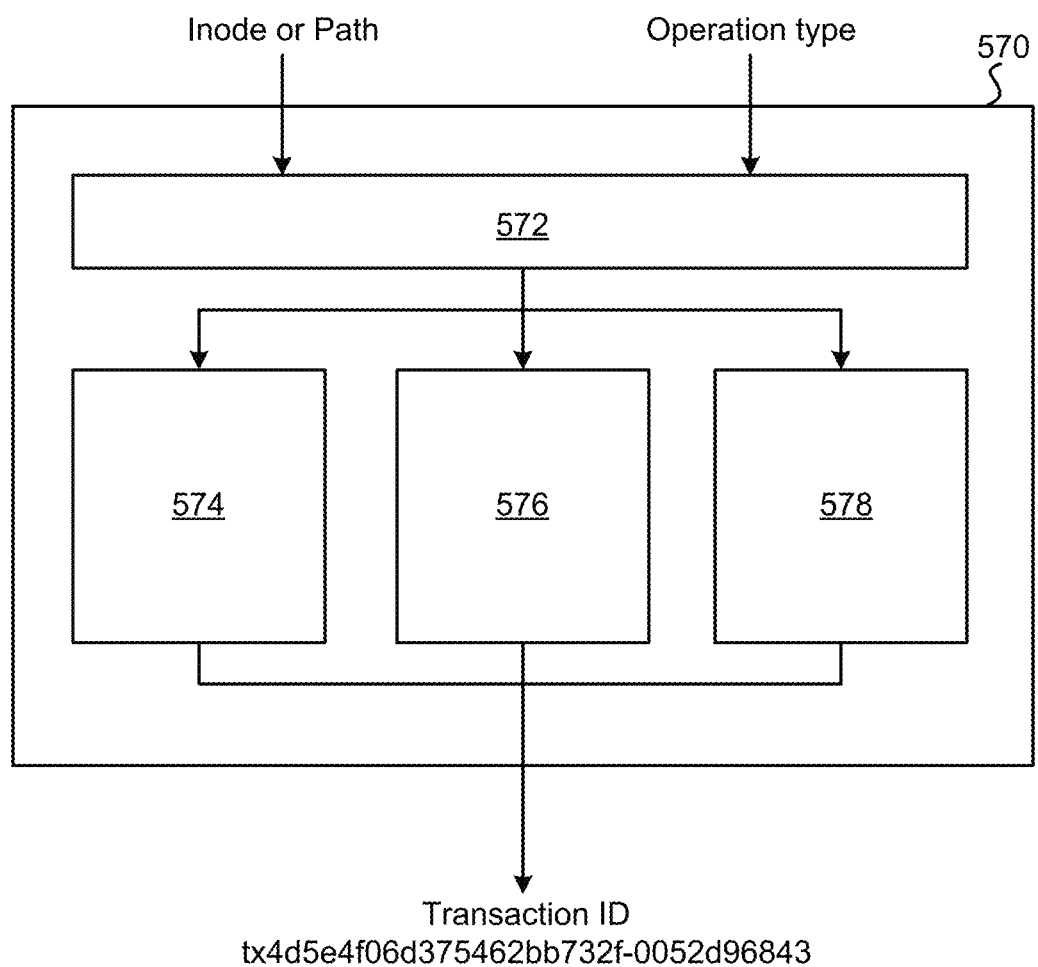
FIG. 5D is a partial representative view of a leveraging placement infrastructure in accordance with one embodiment.

FIG. 5D depicts a leveraging placement infrastructure 570 which may be used during the process of determining a transaction ID for a given file operation according to an illustrative embodiment. Accordingly, the leveraging placement infrastructure 570 of FIG. 5D may be used to perform operation 510 of FIG. 5A in some approaches. However, it should be noted that the leveraging placement infrastructure 570 is illustrated in accordance with one embodiment which is in no way intended to limit the invention.

As shown, a path or inode corresponding to the file operation serves as an input to an exemplary application programming interface (API) 572. An operation type which corresponds to the received file operation serves as a second input for the API 572. The API 572 may be able to convert the information provided in the inputs to data which corresponds to an object transaction ID. Moreover, the API 572 may direct the data to the appropriate component for further performance.

As described above, file operations may actually be performed using different components depending on the type of file operation. The API 572 may therefore direct the information provided in the inputs and/or data derived from the input information to an appropriate one of the object-based component 574, container-based component 576, and account-based component 578, e.g., using any of the approaches described herein. The component may then use the provided information and/or derived data to determine a transaction ID which is then output as a result. An exemplary transaction ID has been illustrated in FIG. 5D which is in no way intended to limit the invention.

As previously mentioned, the type of file operation received may vary depending on the approach. For instance, a file operation may include a "PUT" or "CREATE" command, an "UPDATE" command, a "POST" command, a "DELETE" command, etc. Certain types of file operations may also have predefined templates associated therewith. In other words, a template which specifies a certain number and/or order of sub-operations to be performed for a given object-based operation may be predefined for certain types of file operations that are received. Thus, custom templates which include full lists of sub-operations for each file operation may be implemented depending on the desired approach.

According to an in-use example, which is in no way intended to limit the invention, a file operation which includes a "PUT" command may be received. Accordingly, a provision to feed a custom template may be enabled, the custom template including a full list of sub-operations corresponding to the received file operation. The predefined template corresponding to the received "PUT" command may include the following sub-operations: {'sub-operation 1'-'create tmp directory', 'sub-operation 2'-'create tmp file', 'sub-operation 3'-'write data', 'sub-operation 4'-'rename', 'sub-operation 5'-'write metadata', 'sub-operation 6'-'update container db', 'sub-operation 7'-'update account db'}.

Figure 6:
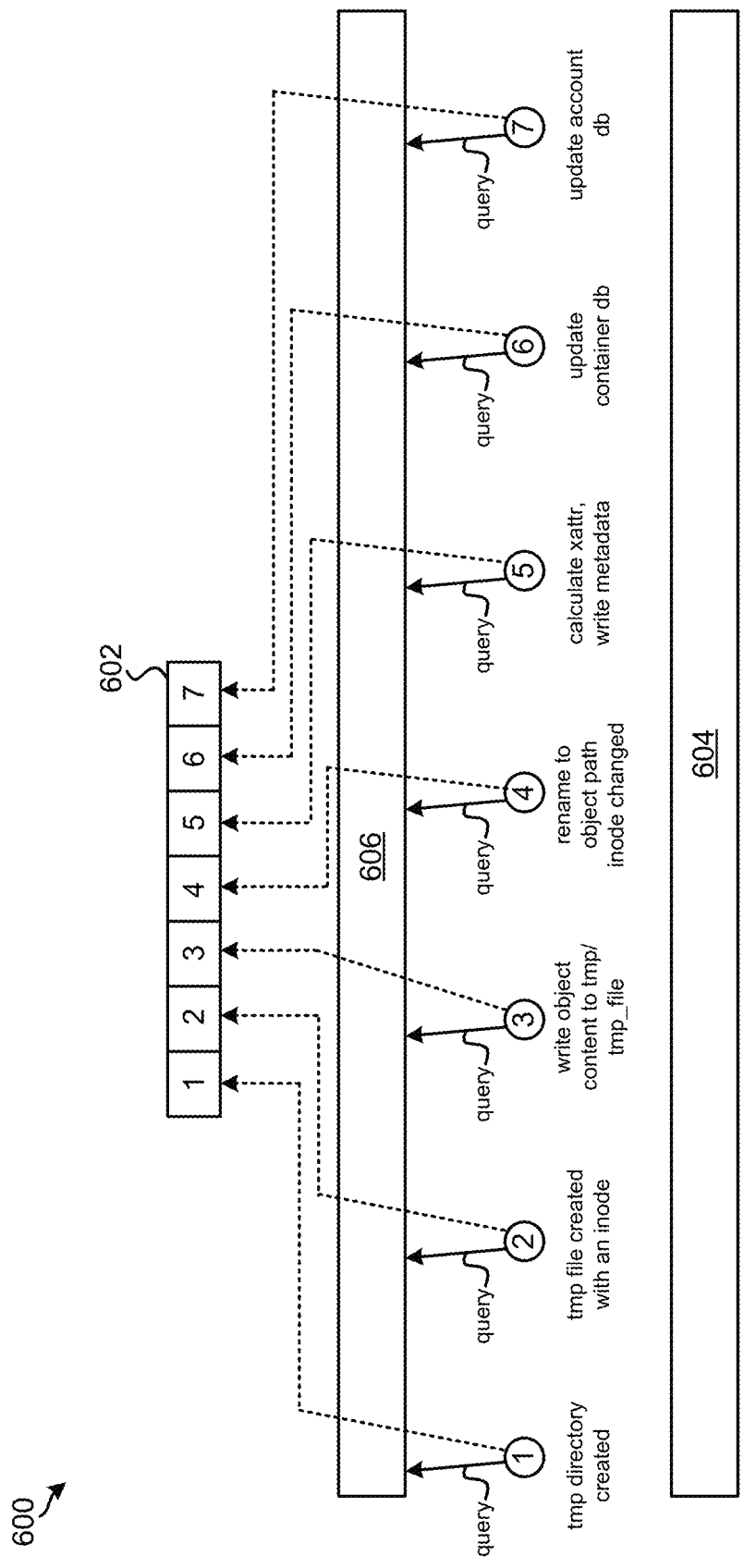
FIG. 6 is a representative view of a unique queue implemented at a remote storage site in accordance with an in-use example.

Referring to FIG. 6, a unique queue 602 implemented by a file system 604 at a remote storage site 600 is illustrated according to the present in-use example. Accordingly, the process of generating the unique queue 602 is illustrated as including file operation details for performing the foregoing sub-operations of the "PUT" command according to the present in-use example, which is again in no way intended to limit the invention.

As shown, incoming data is monitored in an attempt to identify a sub-operation which corresponds to sub-operation 1 of the current "PUT" command. Upon detecting a sub-operation which corresponds to sub-operation 1, the path or inode information corresponding thereto is used to obtain the request transaction ID, e.g., as described above. In some approaches, a modified consistency hashing algorithm may be used.

Furthermore, a local unique queue 602 is created using the transaction ID. The unique queue 602 includes a number of empty fields which is preferably equal to a number of sub-operations defined in the predefined template corresponding to the received "PUT" command. Accordingly, the unique queue 602 in the present in-use example has seven fields. The unique queue 602 is further populated with the sub-operations as they are received and determined to be matching with the subsequent sub-operations in the predefined template, e.g., as represented by the dashed lines. This matching may be performed by first querying query a placement data structure 606 in order to obtain the corresponding transaction ID, e.g., according to any one or more of the processes and/or sub-processes included in FIGS. 5A-5C above.

Referring still to FIG. 6, once the unique queue 602 has been filled such that each of the fields in the queue have been satisfied, the unique queue 602 is merged with a global queue at a home site (not shown) in a sequence. Accordingly, the unique queue 602 may be replayed in order at the home site such that it is implemented at the global queue in a strict order.

According to another in-use example, which is in no way intended to limit the invention, a file operation which includes a "DELETE" command may be received. Accordingly, a provision to feed a custom template may be enabled, the custom template including a full list of sub-operations corresponding to the received file operation. The predefined template corresponding to the received "DELETE" command may include the following sub-operations: {'sub-operation 1'-'rename', 'sub-operation 2'-'update container db', 'sub-operation 3'-'update account db', 'sub-operation 4'-'delete'}.

Figure 7:
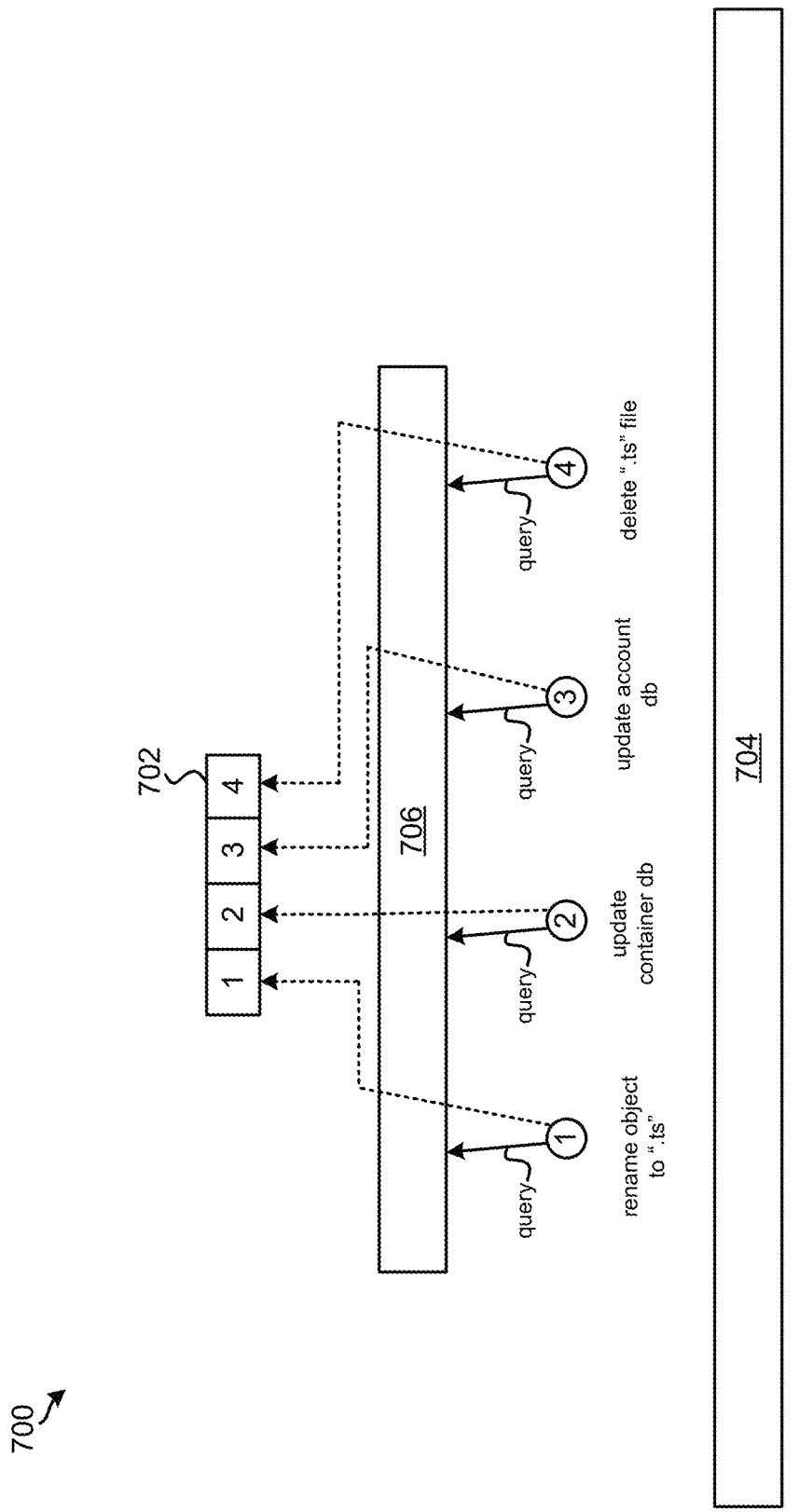
FIG. 7 is a representative view of a unique queue implemented at a remote storage site in accordance with an in-use example.

Referring to FIG. 7, a unique queue 702 implemented by a file system 704 at a remote storage site 700 is illustrated according to the present in-use example. Accordingly, the process of generating the unique queue 702 is illustrated as including file operation details for performing the foregoing sub-operations of the "DELETE" command according to the present in-use example, which is again in no way intended to limit the invention.

As shown, incoming data is again monitored in an attempt to identify a sub-operation which corresponds to 'sub-operation 1' of the current "DELETE" command. Upon detecting a sub-operation which corresponds to 'sub-operation 1', the path or inode information corresponding thereto is used to obtain the request transaction ID, e.g., as described above. In some approaches, a modified consistency hashing algorithm may be used to determine the request transaction ID.

Furthermore, a local unique queue 702 is created using the transaction ID. The unique queue 702 includes a number of empty fields which is preferably equal to a number of sub-operations defined in the predefined template corresponding to the received "DELETE" command. Accordingly, the unique queue 702 in the present in-use example has four fields. The unique queue 702 is further populated with the sub-operations as they are received and determined to be matching with the subsequent sub-operations in the predefined template, e.g., as represented by the dashed lines. This matching may be performed by first querying query a placement data structure 706 in order to obtain the corresponding transaction ID, e.g., according to any one or more of the processes and/or sub-processes included in FIGS. 5A-5C above.

Referring still to FIG. 7, once the unique queue 702 has been filled such that each of the fields in the queue have been satisfied, the unique queue 702 is merged with a global queue at a home site (not shown) in a sequence. Accordingly, the unique queue 702 may be replayed in order at the home site such that it is implemented at the global queue in a strict order.

It follows that various ones of the embodiments included herein are able to provide a framework which improves the process of analyzing file operations, querying placement algorithms to obtain a transaction ID for each of the file operations, and grouping file operations based on respective transaction IDs. Moreover, some of the approaches included herein are able to create a new unique queue for each transaction and/or marking a global queue for each file operation which is received, thereby making the process of tracing (e.g., tracking) each of the file operations more accurate and efficient. Further still, the approaches included herein may be able to improve the process of pushing unique queues to a remote site while also marking inconsistencies of objects if any of the sub-operations corresponding to a given file operation are lost, e.g., due to in network issues such as latency.

These improvements are able to desirably achieve increased reliability and consistency across sites in a WAN caching environment. As a result, users may be able to effectively utilize active object offering, thereby significantly reducing application downtime.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving a file operation;
determining a transaction identification which corresponds to the file operation;
using the transaction identification to create a unique queue which corresponds to the file operation, wherein a number of fields included in the unique queue is equal to a number of sub-operations included in a predefined template associated with the file operation;
populating the number of fields included in the unique queue as each of the respective number of sub-operations are performed;
determining whether each of the number of fields in the unique queue have been populated; and
sending the unique queue to a global queue in response to determining that each of the number of fields in the unique queue have been populated.

2. The computer-implemented method of claim 1, comprising:
receiving an indication that the unique queue has successfully been incorporated into the global queue; and
deleting the unique queue in response to receiving the indication.

3. The computer-implemented method of claim 1, wherein populating the number of fields included in the unique queue as each of the respective number of sub-operations are performed includes:
monitoring received file operations;
determining whether any of the received file operations correspond to one or more of the number of sub-operations included in the predefined template; and
using a placement algorithm to direct one or more of the received file operations to the unique queue in response to determining that one or more of the received file operations correspond to one or more of the number of sub-operations included in the predefined template.

4. The computer-implemented method of claim 1, wherein determining a transaction identification which corresponds to the file operation includes:
determining a path which corresponds to the file operation;
determining an operation type of the file operation;
in response to determining that the operation type of the file operation is a container type or an account type, identifying a corresponding object;
identifying a location of the object; and
obtaining the transaction identification using the identified location of the object.

5. The computer-implemented method of claim 4, comprising:
in response to determining that the operation type of the file operation is an object type, identifying the location of the object; and
obtaining the transaction identification using the identified location of the object.

6. The computer-implemented method of claim 1, comprising:
receiving a second file operation;
determining a second transaction identification which corresponds to the second file operation;
using the second transaction identification to create a second unique queue which corresponds to the second file operation, wherein a number of fields included in the second unique queue is equal to a number of sub-operations included in a predefined template associated with the second file operation;

populating the number of fields included in the second unique queue as each of the respective number of sub-operations are performed;

determining whether each of the number of fields in the second unique queue have been populated; and sending the second unique queue to the global queue in response to determining that each of the number of fields in the second unique queue have been populated.

7. The computer-implemented method of claim 1, wherein the operations are performed by a controller coupled to an object-based file system at a first location, wherein the global queue is included in a second object-based file system at a second location, wherein the first and second locations are geographically separated.

8. The computer-implemented method of claim 7, wherein the controller is configured to communicate with the second object-based file system using a wide area network.

9. A computer program product comprising a computer readable storage medium having program instructions embodied therewith, wherein the computer readable storage medium is not a transitory signal per se, the program instructions readable and/or executable by a controller to cause the controller to perform a method comprising:

receiving, by the controller, a file operation;

determining, by the controller, a transaction identification which corresponds to the file operation;

using, by the controller, the transaction identification to create a unique queue which corresponds to the file operation, wherein a number of fields included in the unique queue is equal to a number of sub-operations included in a predefined template associated with the file operation;

populating, by the controller, the number of fields included in the unique queue as each of the respective number of sub-operations are performed;

determining, by the controller, whether each of the number of fields in the unique queue have been populated; and sending, by the controller, the unique queue to a global queue in response to determining that each of the number of fields in the unique queue have been populated.

10. The computer program product of claim 9, the program instructions readable and/or executable by the controller to cause the controller to perform the method comprising:

receiving, by the controller, an indication that the unique queue has successfully been incorporated into the global queue; and deleting, by the controller, the unique queue in response to receiving the indication.

11. The computer program product of claim 9, wherein populating the number of fields included in the unique queue as each of the respective number of sub-operations are performed includes:

monitoring, by the controller, received file operations;

determining, by the controller, whether any of the received file operations correspond to one or more of the number of sub-operations included in the predefined template; and using, by the controller, a placement algorithm to direct one or more of the received file operations to the unique queue in response to determining that one or more of the received file operations correspond to one or more of the number of sub-operations included in the predefined template.

12. The computer program product of claim 9, wherein determining a transaction identification which corresponds to the file operation includes:

determining, by the controller, a path which corresponds to the file operation;

determining, by the controller, an operation type of the file operation;

in response to determining that the operation type of the file operation is a container type or an account type, identifying, by the controller, a corresponding object;

identifying, by the controller, a location of the object; and obtaining, by the controller, the transaction identification using the identified location of the object, wherein determining a path which corresponds to the file operation includes:

determining whether the path which corresponds to the file operation is available, and in response to determining that the path which corresponds to the file operation is not available, extracting the path from an inode which corresponds to the file operation.

13. The computer program product of claim 12, the program instructions readable and/or executable by the controller to cause the controller to perform the method comprising:

in response to determining that the operation type of the file operation is an object type, identifying, by the controller, the location of the object; and obtaining, by the controller, the transaction identification using the identified location of the object.

14. The computer program product of claim 9, the program instructions readable and/or executable by the controller to cause the controller to perform the method comprising:

receiving, by the controller, a second file operation;

determining, by the controller, a second transaction identification which corresponds to the second file operation;

using, by the controller, the second transaction identification to create a second unique queue which corresponds to the second file operation, wherein a number of fields included in the second unique queue is equal to a number of sub-operations included in a predefined template associated with the second file operation;

populating, by the controller, the number of fields included in the second unique queue as each of the respective number of sub-operations are performed;

determining, by the controller, whether each of the number of fields in the second unique queue have been populated; and sending, by the controller, the second unique queue to the global queue in response to determining that each of the number of fields in the second unique queue have been populated.

15. The computer program product of claim 9, wherein the operations are performed by a controller coupled to an object-based file system at a first location, wherein the global queue is included in a second object-based file system at a second location, wherein the first and second locations are geographically separated wherein the controller is configured to communicate with the second object-based file system using a wide area network.

16. The computer program product of claim 9, the program instructions readable and/or executable by the controller to cause the controller to perform the method comprising:

determining, by the controller, whether the file operation corresponds to a predefined template, wherein determining the transaction identification which corresponds to the file operation is performed in response to determining that the file operation corresponds to a predefined template; and pushing, by the controller, the file operation directly to the global queue in response to determining that the file operation does not correspond to a predefined template, wherein the unique queue corresponds to the file operation individually such that the unique queue is only used to track the number of sub-operations included in the predefined template associated with the file operation.

17. A system, comprising:

a processor; and logic integrated with the processor, executable by the processor, or integrated with and executable by the processor, the logic being configured to:

receive, by the processor, a file operation;

determine, by the processor, a transaction identification which corresponds to the file operation;

use, by the processor, the transaction identification to create a unique queue which corresponds to the file operation, wherein a number of fields included in the unique queue is equal to a number of sub-operations included in a predefined template associated with the file operation;

populate, by the processor, the number of fields included in the unique queue as each of the respective number of sub-operations are performed;

determine, by the processor, whether each of the number of fields in the unique queue have been populated; and send, by the processor, the unique queue to a global queue in response to determining that each of the number of fields in the unique queue have been populated.

18. The system of claim 17, wherein populating the number of fields included in the unique queue as each of the respective number of sub-operations are performed includes:

monitoring, by the processor, received file operations;

determining, by the processor, whether any of the received file operations correspond to one or more of the number of sub-operations included in the predefined template; and using, by the processor, a placement algorithm to direct one or more of the received file operations to the unique queue in response to determining that one or more of the received file operations correspond to one or more of the number of sub-operations included in the predefined template.

19. The system of claim 17, wherein determining a transaction identification which corresponds to the file operation includes:

determining, by the processor, a path which corresponds to the file operation;

determining, by the processor, an operation type of the file operation;

in response to determining that the operation type of the file operation is a container type or an account type, identifying, by the processor, a corresponding object;

identifying, by the processor, a location of the object;

obtaining, by the processor, the transaction identification using the identified location of the object;

in response to determining that the operation type of the file operation is an object type, using, by the processor, the file operation to determine a location of the object; and obtaining, by the processor, the transaction identification using the determined location of the object.

20. The system of claim 17, the logic being configured to:

receive, by the processor, an indication that the unique queue has successfully been incorporated into the global queue; and delete, by the processor, the unique queue in response to receiving the indication, wherein the processor is coupled to an object-based file system at a first location, wherein the global queue is included in a second object-based file system at a second location, wherein the processor is configured to communicate with the second object-based file system using a wide area network, wherein the unique queue is not used to track sub-operations associated with any other received file operations.

* * * * *